United States Patent
Baek et al.

(10) Patent No.: US 6,816,220 B2
(45) Date of Patent: Nov. 9, 2004

(54) LIQUID CRYSTAL DISPLAY

(75) Inventors: Seung-Soo Baek, Suwon (KR); Woon-Yong Park, Suwon (KR); Sahng-IK Jun, Seoul (KR); Il-Gon Kim, Suwon (KR); Byoung-Sun Na, Suwon (KR); Young-Mi Tak, Seoul (KR); Yu-Ri Song, Seoul (KR)

(73) Assignee: Samsung Electronics Co., Ltd., Kyunki-Do (KR)

( * ) Notice: Subject to any disclaimer, the term of this patent is extended or adjusted under 35 U.S.C. 154(b) by 14 days.

(21) Appl. No.: 10/108,774

(22) Filed: Mar. 28, 2002

(65) Prior Publication Data

US 2002/0140892 A1 Oct. 3, 2002

(30) Foreign Application Priority Data

Mar. 28, 2001 (KR) ........................................ 2001-16156

(51) Int. Cl.[7] ...................... G02F 1/1343; G02F 1/1337
(52) U.S. Cl. ........................ 349/139; 349/129; 349/143
(58) Field of Search ........................ 349/38, 139, 129, 349/141–144

(56) References Cited

U.S. PATENT DOCUMENTS 6,407,794 B2 * 6/2002 Koma ........................ 349/141

2001/0040656 A1 * 11/2001 Na et al. ..................... 349/110
2002/0145695 A1 * 10/2002 Kim et al. ................... 349/141

FOREIGN PATENT DOCUMENTS

JP          3-144420      *   6/1991

* cited by examiner

Primary Examiner—Dung Nguyen
(74) Attorney, Agent, or Firm—F. Chau & Associates, LLC

(57) ABSTRACT

A liquid crystal display includes: a first substrate; a first signal line formed on the first substrate and extending in a direction; a second signal line intersecting the first signal line while being insulated; a pixel electrode formed in a pixel area defined by intersections of the first signal line and the second signal line, the pixel electrode having a plurality of partitions; a switching element connected to the first signal line, the second signal line, and the pixel electrode; a second substrate opposite the first substrate; a black matrix formed on the second substrate; and a common electrode formed over the second substrate having a plurality of domain defining members, wherein each domain is enclosed by the partitions of the pixel electrode and the domain defining members and has at least one long side parallel or perpendicular to the first signal line and at least one short side curved at an angle of about 30 to about 60 degrees with the first signal line.

24 Claims, 18 Drawing Sheets

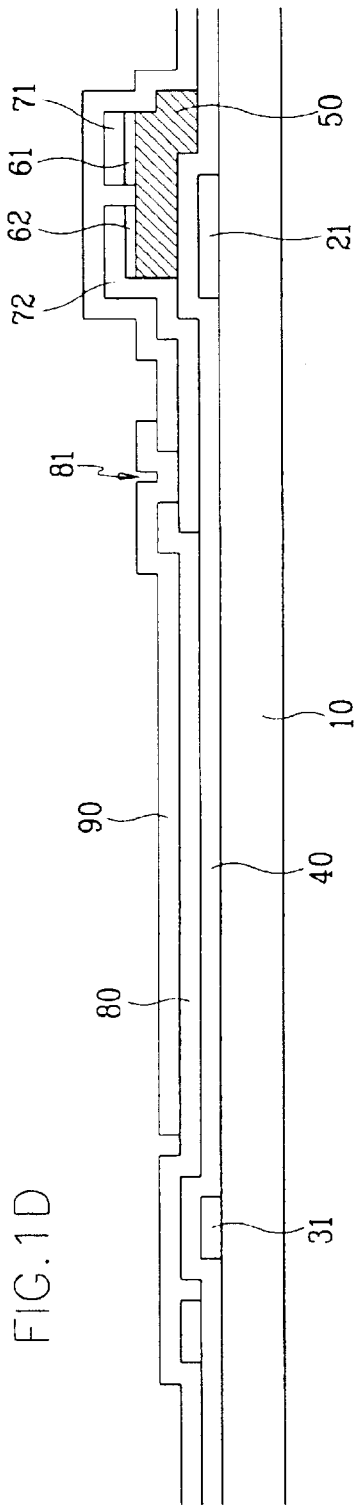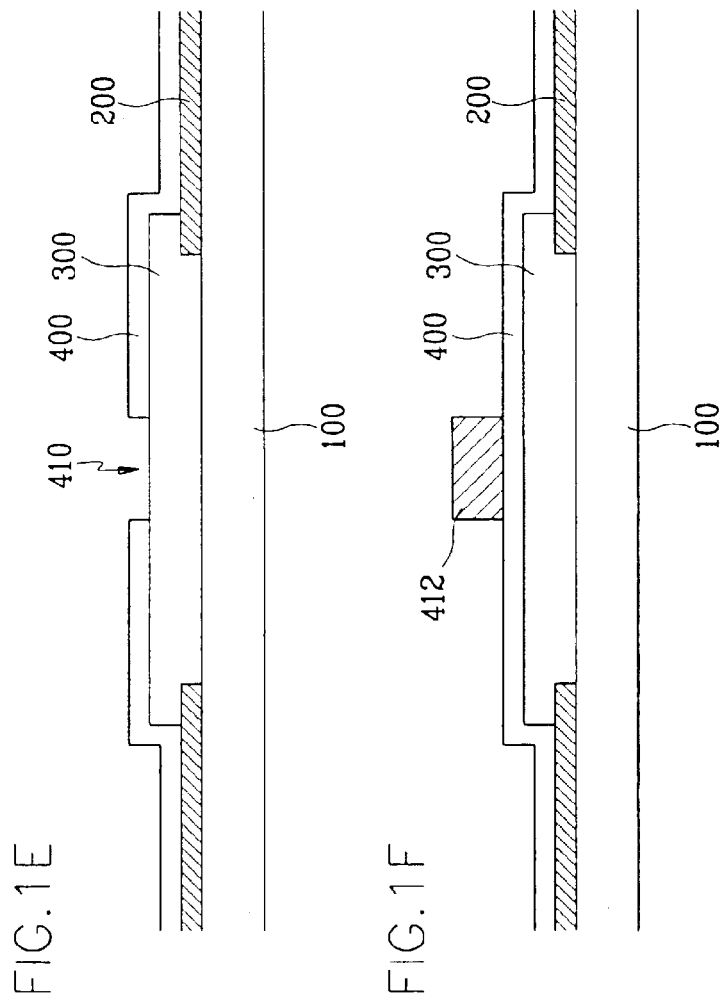
FIG. 1D
FIG. 1E
FIG. 1F

POLARIZING AXES

POLARIZING AXES

THE EARIER STAGE OF A FRAME

PRIOR ART

THE LATER STAGE OF A FRAME

PRIOR ART

LIQUID CRYSTAL DISPLAY

BACKGROUND OF THE INVENTION (a) Field of the Invention

The present invention relates to a liquid crystal display (LCD), and more particularly, to a liquid crystal display having a plurality of pixel areas divided into a number of domains to obtain a wide viewing angle.

(b) Description of the Related Art

In general, a liquid crystal display has an upper panel including a common electrode and a plurality of color filters, a lower panel including a plurality of thin film transistors and pixel electrodes, and a liquid crystal layer having liquid crystal molecules therebetween. The pixel electrodes and the common electrode are applied with electrical voltages to generate an electric field to vary the arrangement of the liquid crystal molecules, thereby controlling the transmittance of light passing through the liquid crystal layer. Since a pair of polarizers are attached to the upper and the lower panels, respectively, the light incident on the liquid crystal layer after passing through one polarizer varies its polarization during its progress in the liquid crystal layer, and the resulting polarization of the light determines the transmittance of the light out of the other polarizer.

Conventional LCDs typically have narrow viewing angles. Various techniques for widening the viewing angle have been developed. One of the techniques is to align the liquid crystal molecules perpendicular to the upper and the lower panels, and to form apertures or protrusions in the pixel electrodes and the common electrode opposite to the pixel electrodes.

The technique related to the apertures is to control the tilt directions of the liquid crystal molecules by using the fringe field generated by the apertures for widening the viewing angle.

The technique related to the protrusions is to control the tilt directions of the liquid crystal molecules by altering the electrical field using the protrusions.

Another technique is to provide the apertures in the pixel electrodes of the lower panel and the protrusions on the common electrode of the upper panel for controlling the tilt directions of the liquid crystal molecules.

These mentioned techniques to obtain a wide viewing angle are to provide a plurality of domains wherein most of the liquid crystal molecules in each domain are aligned in the same direction. The domain has two long sides and two short sides for improving the fringe field effect and the response time. However, in these liquid crystal displays, there are disadvantages in that the image quality is deteriorated because of the texture which departs from the short sides and deeply penetrate into the center of domains, and from overshoot of brightness that appear more brightly in the first stage of every frame on a screen. Thus it is desirable to reduce generation of the textures and to prevent the overshoot of brightness, thereby enhancing the image quality of a liquid crystal display.

SUMMARY OF THE INVENTION

A liquid crystal display is provided, which includes: a first substrate; a first signal line formed on the first substrate and extending in a direction; a second signal line intersecting but insulated from the first signal line; a pixel electrode formed in a pixel area defined by intersections of the first signal line and the second signal line, the pixel electrode having a plurality of partitions; a switching element connected to the first signal line, the second signal line, and the pixel electrode; a second substrate opposite the first substrate; a black matrix formed on the second substrate; and a common electrode formed over the second substrate having a plurality of domain defining members, wherein each domain is enclosed by the partitions of the pixel electrode and the domain defining members and has at least one long side parallel or perpendicular to the first signal line and at least one short side curved at an angle of about 30 to about 60 degrees with the first signal line.

According to an aspect of the present invention, the pixel electrode is made of such as ITO (indium tin oxide) or IZO (indium zinc oxide). Each of the plurality of the partitions has a rectangular shape and includes at least one chamfered corner or at least one convex corner. Each of the plurality of the partitions is arranged in the same direction as the second signal line. The plurality of partitions are connected by connecting members therebetween. The black matrix is made of a double-layered structure of $Cr/CrO_2$.

According to a preferred embodiment of the present invention, a plurality of storage electrodes are further included between each of the plurality of partitions of the pixel electrode.

According to an aspect of the present invention, the plurality of domain defining members include a plurality of apertures. Each of the plurality of apertures has at least one end part shaped triangle. The triangle has an angle made by the bottom side and both lateral sides of the triangle in the range of about 30° to about 60°. The plurality of domain defining members include a plurality of protrusions.

According to an aspect of the present invention, a liquid crystal layer is further included between the first substrate and the second substrate.

A liquid crystal display is also provided, which includes: a first panel including a first signal line, a second signal line intersecting the first signal line, a pixel electrode having a plurality of partitions, and a thin film transistor, wherein the thin film transistor includes a gate electrode extended from the first signal line, a source electrode extended from the second signal line, and a drain electrode connected to the pixel electrode, wherein the pixel electrode is formed in a pixel area defined by intersections of the first signal line and the second signal line; and a second panel disposed opposite the first panel, the second panel including a common electrode having a plurality of domain defining members, each of the plurality of domain defining members having at least one end portion shaped substantially as a triangle.

According to an aspect of the present invention, a liquid crystal layer is further included between the first panel and the second panel and a black matrix is further included on the second panel to define the pixel area.

BRIEF DESCRIPTION OF THE DRAWINGS

The above and other objects and advantages of the present invention will become more apparent by describing in detail preferred embodiments thereof with reference to the accompanying drawings in which:

FIGS. 1A to 5A are layout views of thin film transistor array panels for liquid crystal displays according to the first to fifth embodiments of the present invention, respectively;

FIGS. 1B to 5B are layout views of color filter panels for liquid crystal displays according to the first to fifth embodiments of the present invention, respectively;

FIGS. 1C to 5C are layout views of liquid crystal displays according to the first to fifth embodiments of the present invention, respectively;

FIG. 1D is a cross-sectional view of the thin film transistor array panel taken along the line ID–ID' of FIG. 1A;

DETAILED DESCRIPTION OF PREFERRED EMBODIMENTS

Figure 1A:
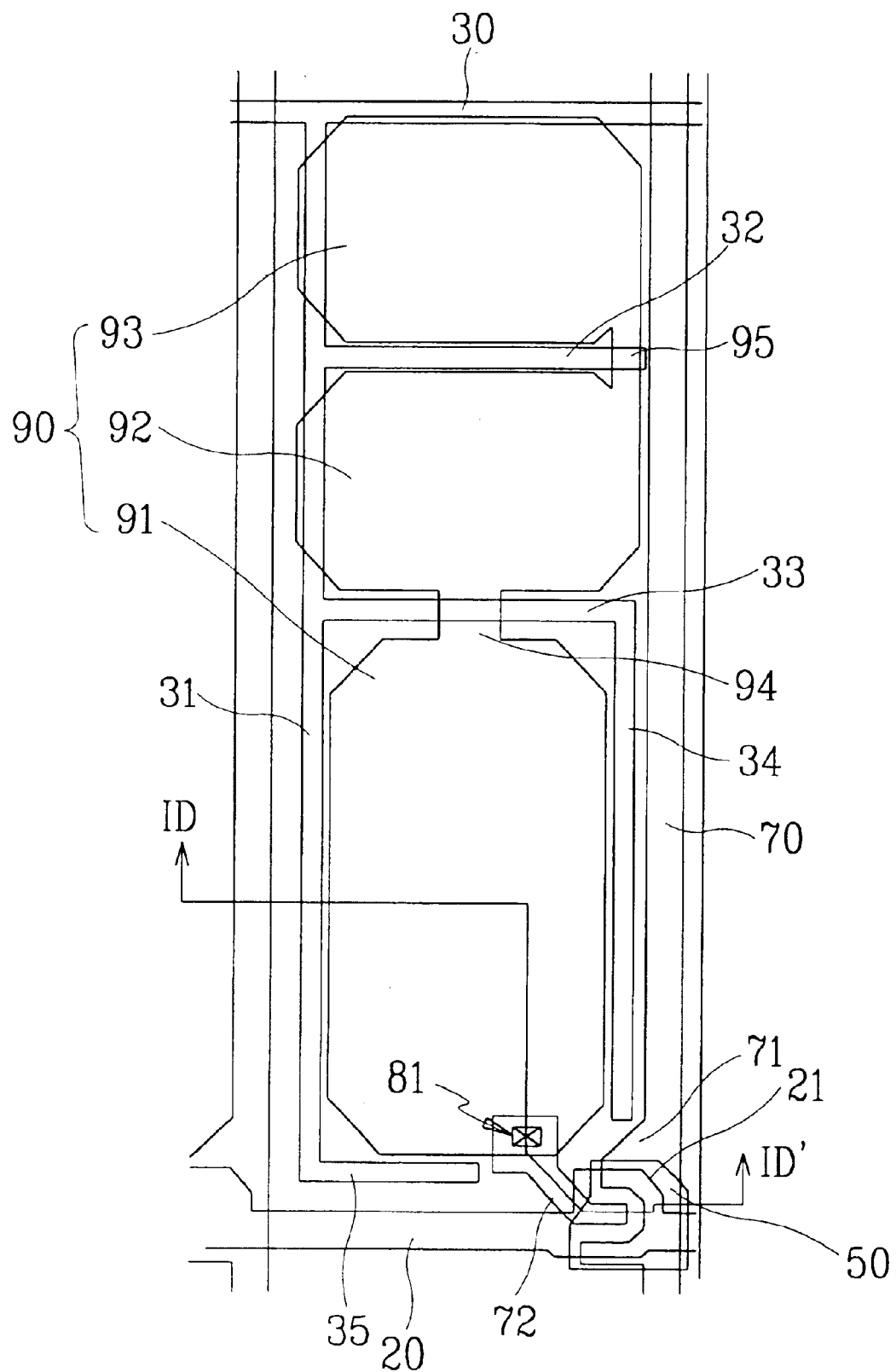

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Then, liquid crystal displays according to embodiments of the present invention will be described with reference to the drawings.

A liquid crystal display according to a preferred embodiment of the present invention will be described with reference to FIGS. 1A to 1E.

Figure 1B:
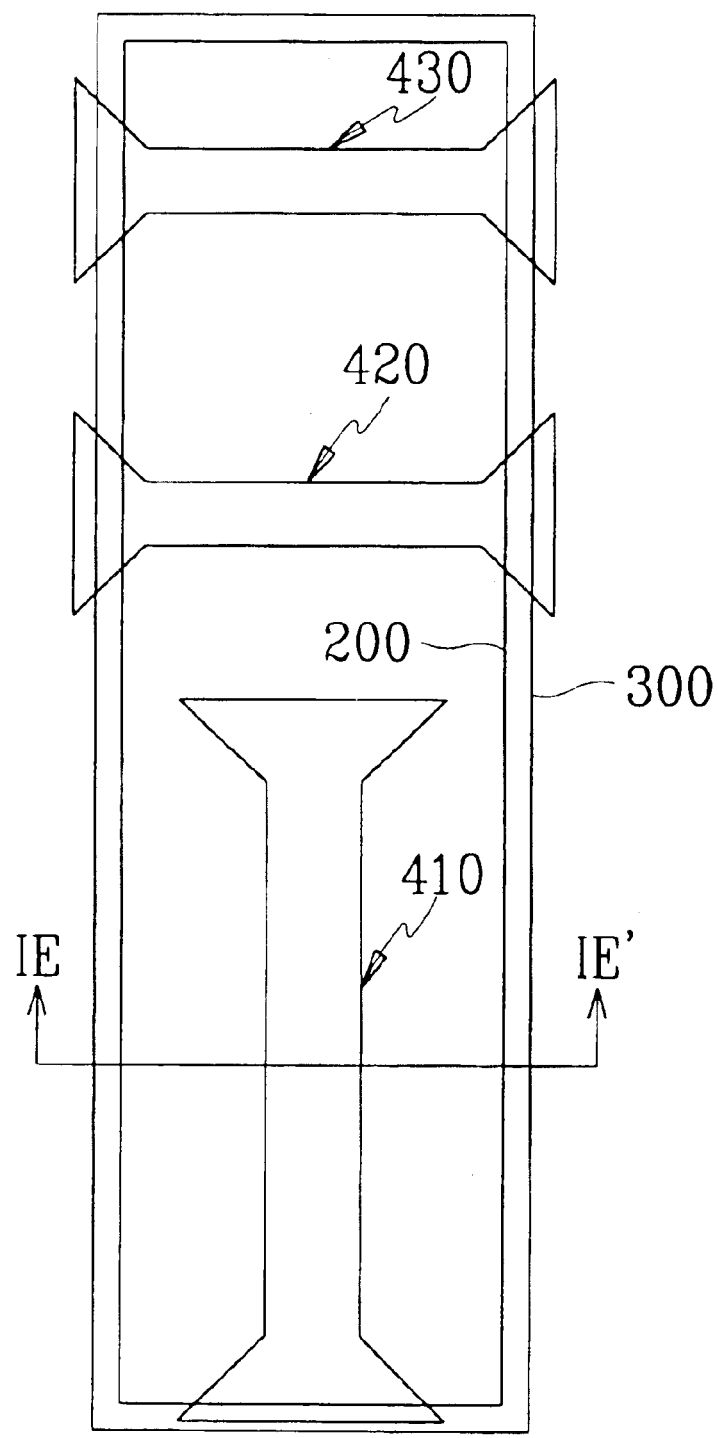
Figure 1C:
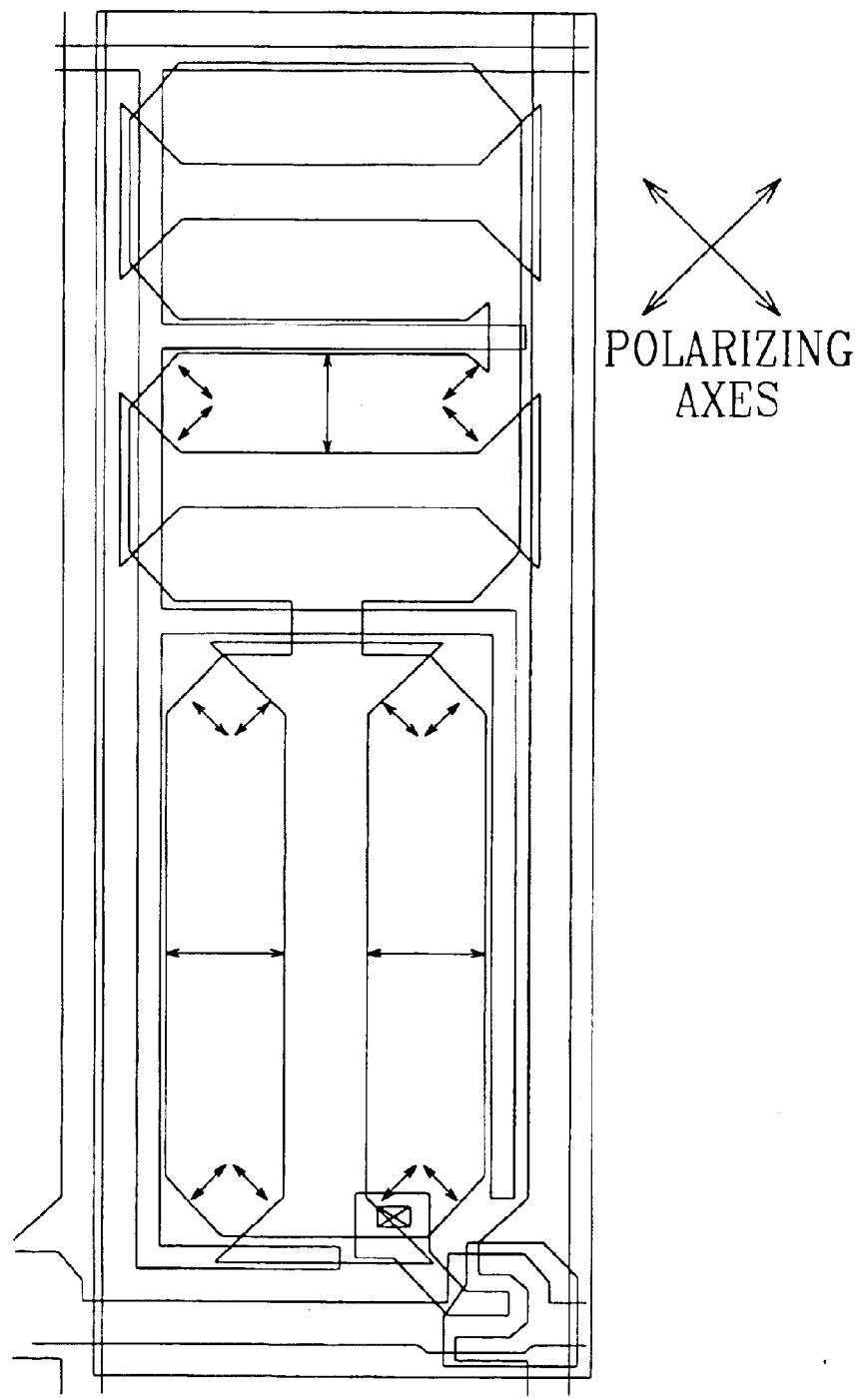
Figure 1E:
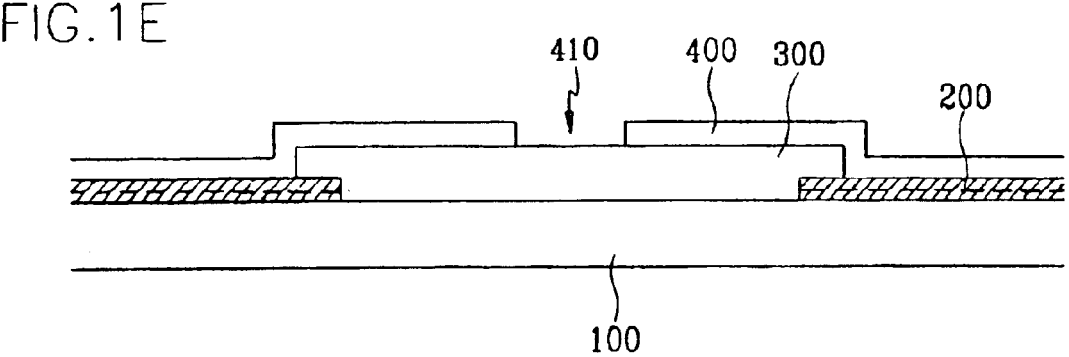
FIG. 1E is a cross-sectional view of the color filter panel taken along the line I E–IE' of FIG. 1B.

FIGS. 1A, 1B, and 1C are layout views of a thin film transistor array panel, a color filter panel, and a liquid crystal display according to the first embodiment of the present invention, respectively. FIGS. 1D and 1E are cross-sectional views taken along the lines ID–ID' and IE–IE' of FIGS. 1A and 1B, respectively.

Now, a thin film transistor array panel for a liquid crystal display according to the first embodiment will be described with reference to FIGS. 1A and 1D.

A gate wire such as a gate line 20 extending in a transverse direction, a gate electrode 21 which extends from the gate line 20 is formed on an insulating substrate 10 such as transparent glass. A storage electrode wire having a plurality of storage electrode lines 30–35 on the insulating substrate 10 is also formed on the insulating substrate 10. The storage electrode line 30 is formed in parallel to the gate line 20. The other storage electrode lines such as the first to fifth storage electrode lines 31–35 are branches of the storage electrode line 30. The first storage electrode line 31 directly connected to the storage electrode line 30 extends in a longitudinal direction, and the second and the third storage electrode lines 32 and 33 are connected to the first storage electrode line 31 and extend in a transverse direction. The fourth storage electrode line 34 extends in the longitudinal direction and is connected to an end of the third storage electrode line 33. The fifth storage electrode line 35 is connected to an end of the first storage electrode line 31 and extends in the transverse direction.

The gate line 20, the gate electrode 21, and the plurality of storage electrode lines 30–35 are covered with a gate insulating film 40, preferably made of $SiO_x$, $SiN_x$, or the like. On the gate insulating film 40, a semiconductor layer 50, preferably made of amorphous silicon, polysilicon, or the like is formed opposite the gate electrode 21. Two separate ohmic contact layers 61 and 62, preferably made of amorphous silicon heavily doped with N-type impurity such as phosphorus are formed on the semiconductor layer 50. A data line 70 is formed on the gate insulating layer 40 and the ohmic contact layers 61 and 62, and the date line 70 intersects the gate line 20. A source electrode 71 extended from the date line 70 is formed on the ohmic contact layer 61, and a drain electrode 72 is formed opposite the source electrode 71 on the ohmic contact layer 61. The ohmic contact layers 61 and 62 are interposed for reducing the resistance between the semiconductor layer 50 and the source and the drain electrodes 71 and 72. The source electrode 71 has a U-shape.

A passivation film 80 having a contact hole 81, preferably made of $SiO_2$ or $SiN_x$ or a multi-layered structure including the layers made of the $SiO_2$ or $SiN_x$, covers the data line 70, the source electrode 71, the drain electrode 72, and the exposed portion of the semiconductor layer 50. A contact hole 81 exposes the drain electrode 72. According to an embodiment of the present invention, the passivation film 80 can be formed from a thick organic insulating film.

A pixel electrode 90 connected to the drain electrode 72 through the contact hole 81, located in a pixel area defined by intersections of two adjacent gate line 20 and data line 70, is formed on the passivation film 80. According to a preferred embodiment of the present invention, the pixel electrode 90 is preferably made of transparent or opaque conductive material such as ITO (indium tin oxide) or IZO (indium zinc oxide).

According to an embodiment of the present invention, the pixel electrode 90 has a plurality of partitions, each partition is connected by connecting members therebetween. For explanation, the pixel electrode 90 can be divided into a lower, a middle, and an upper partitions 91, 92, 93 as shown in FIG. 1A, which are arranged in the longitudinal direction. The lower partition 91 and the middle partition 92 are connected via connecting member 94. The middle partition 92 and the upper partition 93 are connected via connecting member 95. Although the connecting member 94 connecting the lower and the middle partitions 91 and 92 is located at the middle point of their edges and the connecting member 95 connecting the middle and the upper partitions 92 and 93 is located at their corner in this embodiment, the positions of the connecting members 94 and 95 can be varied.

According to an embodiment of the present invention, the lower partition 91 is rectangular shape having four chamfered corners located in the lower half portion of a pixel area, and is directly connected to the drain electrode 72 through the contact hole 81 near the lower edge. The middle and the upper partitions 92 and 93 are also rectangular shape, each having four chamfered corners, and located in the upper half portion of the pixel area. The second storage electrode 32 is located between the middle and the upper partitions 92 and 93. The third storage electrode 33 is located between the lower and the middle pixel electrode 91 and 92. The lower partition 91 is almost surrounded by the first, the third, the fourth, and the fifth storage electrodes 31, 33, 34, 35.

It is preferable that the angles made by the chamfers and the related edges of the low, middle, and upper partitions 91, 92, 93 are in the range of 120° to 150° (or 30° to 60°), and more preferably 135° (or 45°).

Next, a color filter panel according to the first embodiment of the present invention will be described with reference to FIGS. 1B and 1E.

A black matrix 200 having a double-layered structure of $Cr/CrO_2$ is formed on a transparent insulating substrate 100 such as glass to define the pixel area. A color filter 300 is formed in the pixel area of the substrate 100, and a common electrode 400 made of transparent conducting material is formed on the color filter 300, and may cover the whole surface of the substrate 100 including the black matrix 200.

According to an embodiment of the present invention, the common electrode 400 includes a plurality of apertures. For explanation, there are three apertures, such as a first to a third apertures 410, 420, 430 of stripes as shown in FIG. 1B. The first aperture 410 extending in the longitudinal direction divides the lower half of the pixel area into two parts arranged in the transverse direction, and the second and the third apertures 420 and 430 extending in the transverse direction and arranged in the longitudinal direction divide the upper half of the pixel area into three parts arranged in the longitudinal direction. The end partition of the width of the apertures 410, 420, 430 gradually increases to become substantially isosceles triangles. The angles made by the bottom side and both lateral sides of the triangle are in the range of about 30° to about 60°, and more preferably about 45°.

Figure 1F:
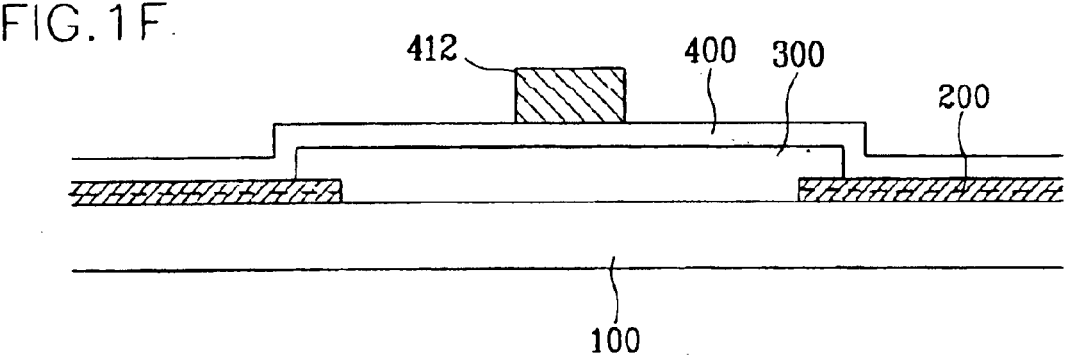
FIG. 1F is a modified example of the color filter panel shown in FIG. 1E.

FIG. 1F shows a modified example of the color filter panel shown in FIG. 1E, where the aperture 410 shown in FIG. 1E is replaced with a protrusion 412. That is, a common electrode 400 has no aperture, and the protrusion 412 is formed on the common electrode 400. The protrusion 412 is preferably made of organic material.

According to an embodiment of the present invention, the black matrix 200 can be made of organic material, and the color filter 300 can be formed in the thin film transistor array panel instead.

Then, a liquid crystal display, which is an assembly of the thin film transistor array panel shown in FIG. 1A and the color filter panel shown in FIG. 1B, will be described with reference to FIG. 1C.

The thin film transistor array panel of the FIG. 1A and the color filter panel of FIG. 1B are first assembled, and then, liquid crystal material is injected into the gap between the two panels and vertically aligned. Two polarizers (not shown) are attached to the outer surfaces of the panels so that their polarizing axes are perpendicular to each other, thereby preparing the liquid crystal display according to the first embodiment.

When the two panels are assembled, the lower, middle, and upper partitions 91, 92, 93 of the thin film transistor array panel shown in FIG. 1A and the apertures 410, 420, 430 in the common electrode 400 of the color filter panel shown in FIG. 1B overlap each other, thereby dividing a pixel region into a number of domains. The pixel region is defined as a portion of the liquid crystal layer between the corresponding pixel areas of both panels. The planar shape of each domain has a long stripe with tapered ends, made by the chamfers of the lower, middle, and upper partitions 91, 92, 93 and the lateral sides of the isosceles triangular ends of the apertures 410, 420, 430. That is, each domain has two long sides and tapered short sides when viewed from the top. The long sides of the domain are substantially parallel to the data line 70 (in FIG. 1A) or the gate line 20 (in FIG. 1A), and curves at an angle of about 45° with the polarizing axes of the polarizer. The tapered sides of the domain curves at an angle of about 30° to about 60° with the data line 70 (in FIG. 1A) or the gate line 20 (in FIG. 1A), and curves at an angle of about 0° to about 15° or about 75° to about 90° with the polarizing axes. It is preferable that the short sides of the domain are parallel or perpendicular to the polarizing axes.

Figure 6A:
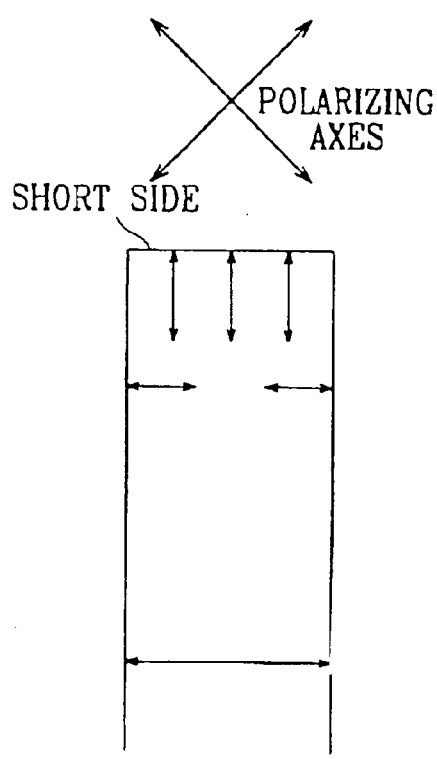
FIGS. 6A and 6B are conventional schematic diagrams of an arrangement of liquid crystal molecules in a domain.
Figure 6B:
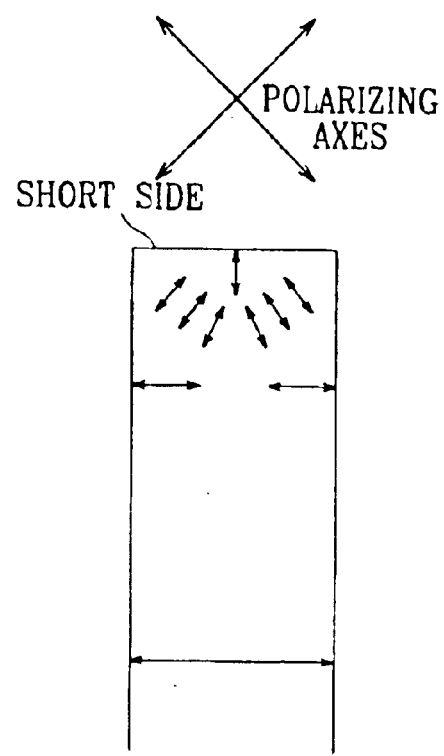

FIGS. 6A and 6B are conventional schematic diagrams showing the arrangements of the liquid crystal molecules at the earlier stage of a frame and at the later stage of a frame, respectively, where the short sides of domains are perpendicular to the long sides and curve at an angle of about 45° with the polarizing axes of polarizers.

When a voltage is applied between a pixel electrode 90 (in FIG. 1A) and a common electrode 400 (in FIG. 1E), the liquid crystal molecules around the sides of the domain tilt in a direction perpendicular to the sides by the electric field as shown in FIG. 6A (at the earlier stage of a frame), and thus curve at an angle of about 45° with the polarizing axes of the polarizers. Therefore, all incident light passes through the polarizers, thereby brightening the pixel. However, the liquid crystal molecules near the short sides begin to align parallel to the polarizing axes due to the elastic force between the molecules, and the number of such molecules increases with time as shown in FIG. 6B (at the later stage of a frame). The light passing through the liquid crystal layer where the long axes of molecules are aligned parallel to one of two polarizing axes is blocked by the other polarizer, thereby generating the black texture in the pixel. Therefore, a phenomenon that the screen, which is bright at the earlier stage of a frame, becomes dark with time, i.e., the overshoot of brightness occurs. In addition, since the short sides and the long sides of the domain are perpendicular to each other, the transitional portion of the arrangement of liquid crystal molecules is deeply distributed into the domain. This transitional portion of the arrangement appears as the texture.

However, since the tapered short sides of the domain according to the present invention as shown in FIG. 1C are parallel to the polarizing axes, the long axes of the liquid crystal molecules aligned perpendicular to the short sides are parallel to one of the polarizing axes and the light passing through these portions is blocked by the other polarizer. This arrangement at the earlier stage changes not so much at the later stage. Therefore, the difference in the brightness of screen between the earlier and the later stages becomes small, and thus the overshoot of the screen brightness is reduced. Furthermore, since the short sides of the domain curve at an angle of about 45° with the long sides, the transitional portion of the arrangement of the liquid crystal molecules may be distributed only near the short sides. Therefore, the texture is not spread into the domain.

As shown in FIG. 1C, each domain is shaped substantially as two trapezoids sharing a common long side.

A liquid crystal display according to the second embodiment of the present invention will be described.

Figure 2A:
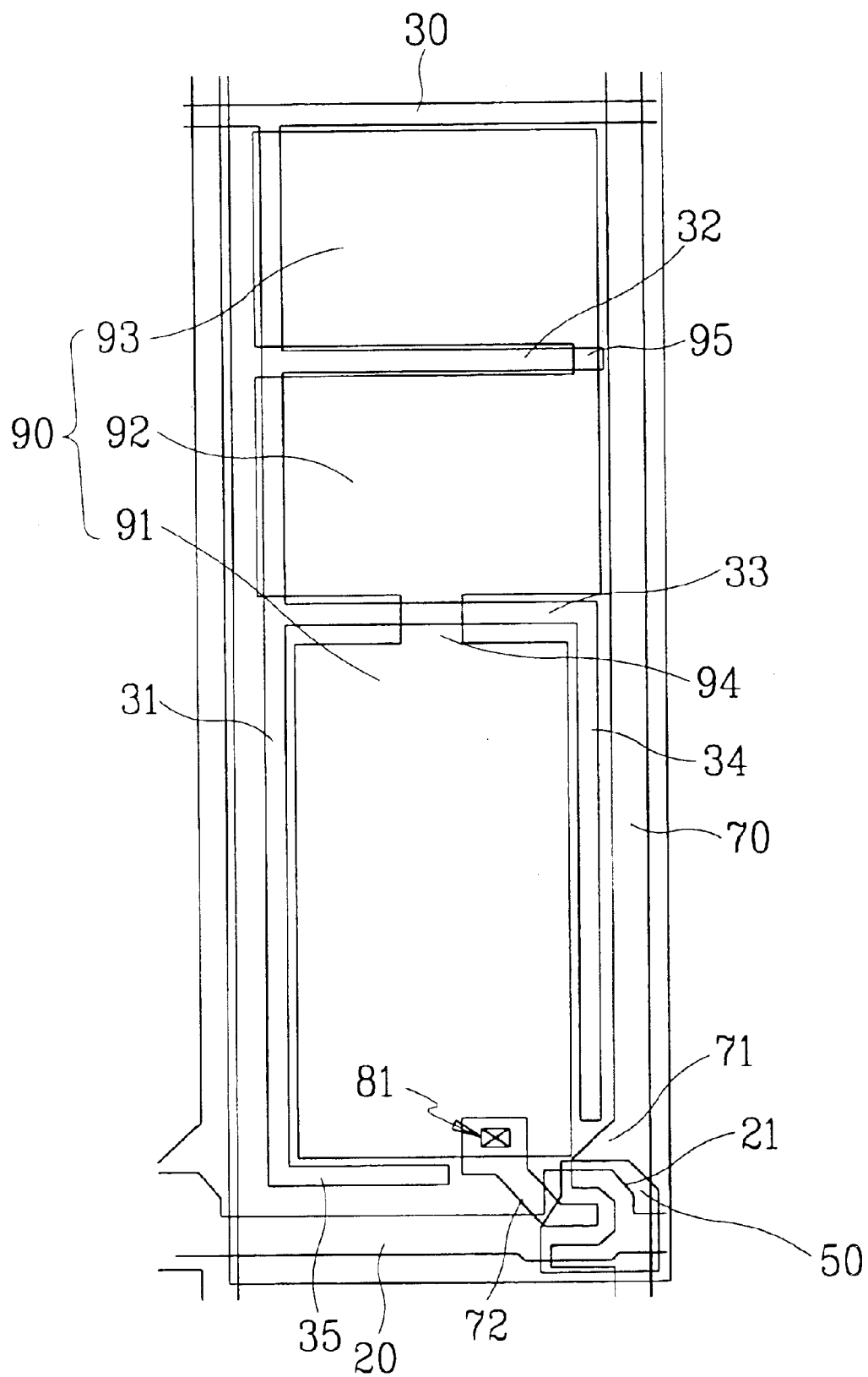
Figure 2B:
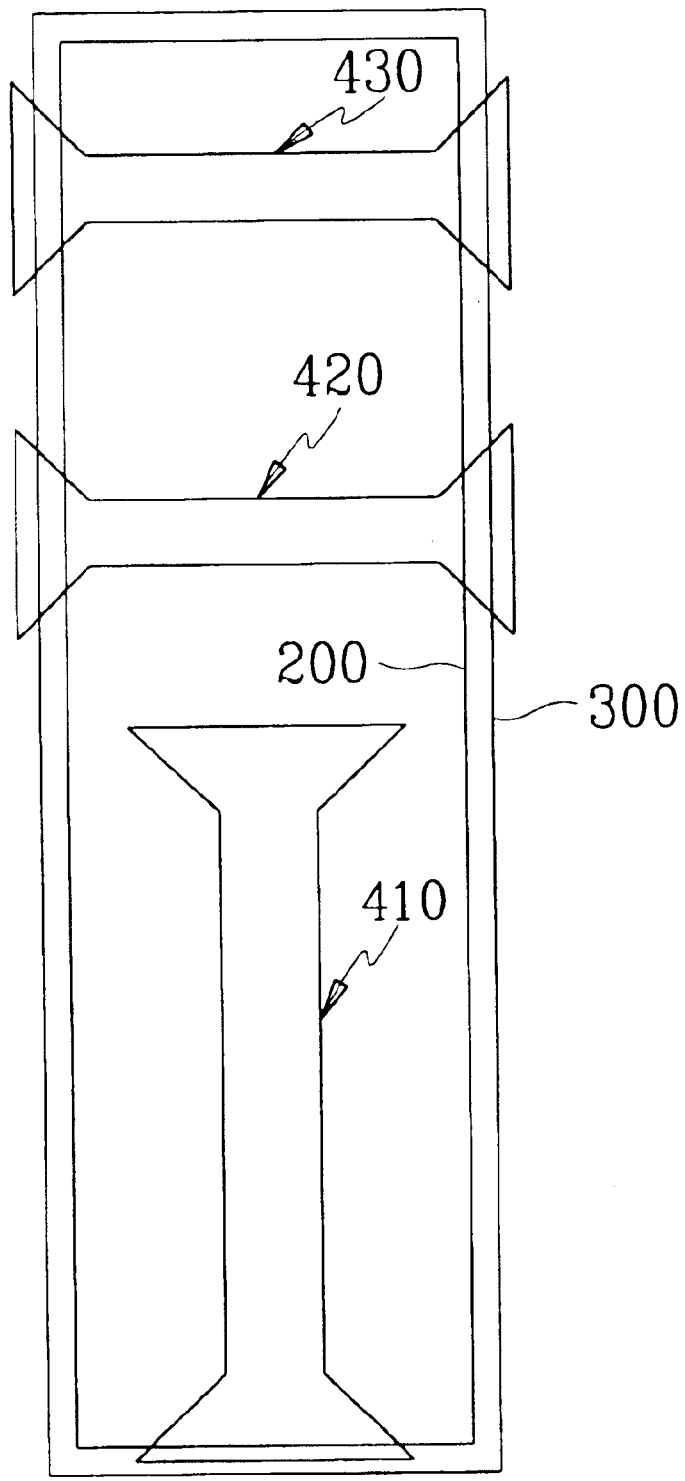
Figure 2C:
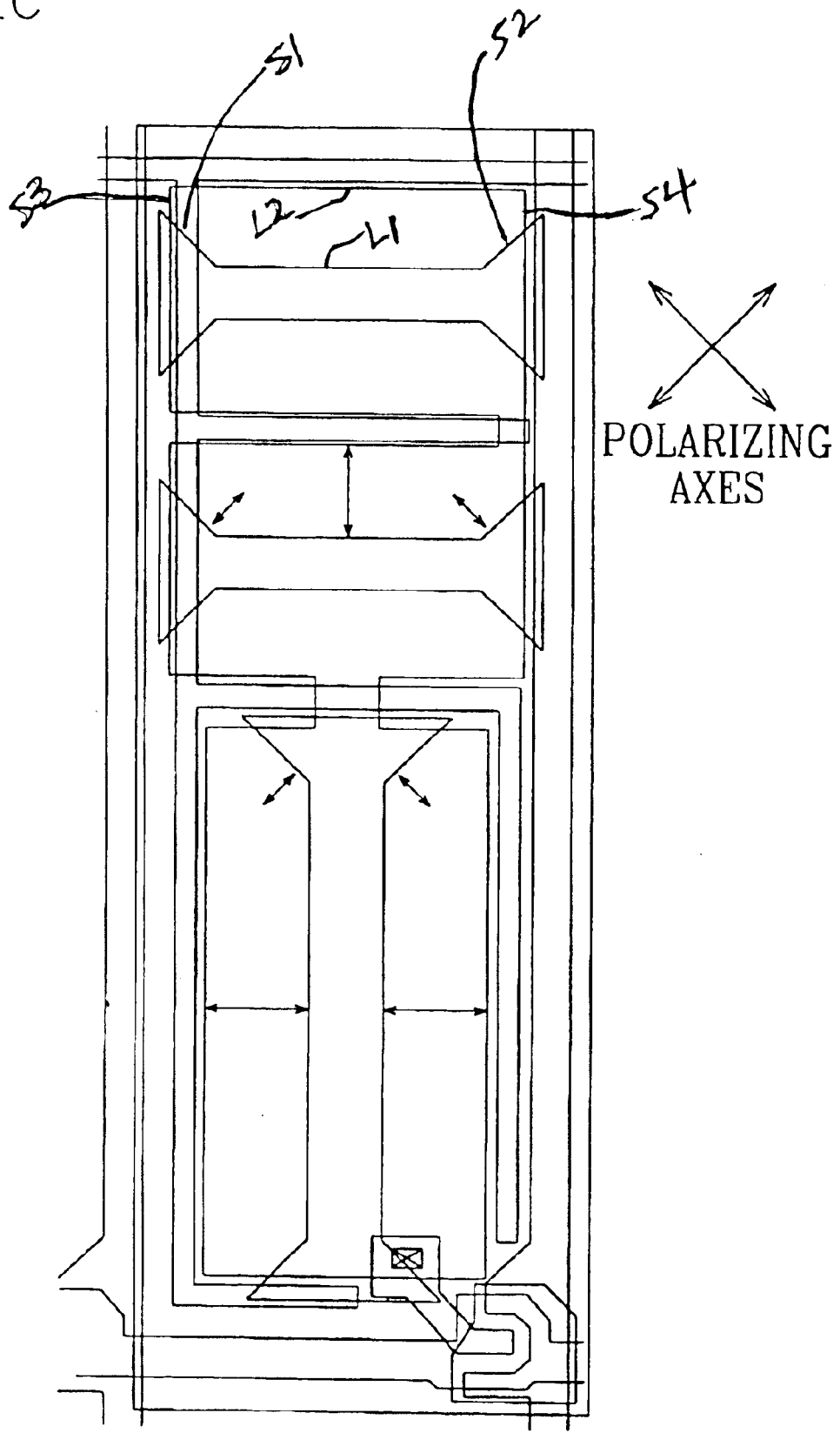

FIGS. 2A, 2B, and 2C are layout views of a thin film transistor array panel, a color filter panel, and a liquid crystal display according to the second embodiment of the present invention, respectively.

As shown in FIGS. 2A, 2B and 2C, except for the planar shape of a pixel electrode 90 of the thin film transistor array panel, a liquid crystal display according to the second embodiment has the same structure as that according to the first embodiment. The difference between the second and the first embodiment is that three partitions 91, 92, 93 of the pixel electrode 90 according to this embodiment are not chamfered.

Therefore, in the liquid crystal display according to the second embodiment of the present invention, each domain, enclosed by apertures 410, 420, and 430 in a common electrode 400 (in FIGS. 1E and 1F) and the partitions 91, 92, and 93 of the pixel electrode 90, have two long sides and four short sides. Two of the short sides (S1 and S2 of FIG. 2C) of each domain curve at an angle of about 120° to about 150° with a long side L1 and the other two short sides S3 and S4 are perpendicular to a long sides L2. The tapered short sides are substantially symmetrically arranged with respect to other sides. The domain formed by S1 to S4, L1 and L2 is shaped substantially like a trapezoid joined with a rectangle.

The tapered short sides prevent the overshoot of the screen brightness and reduce the texture as explained in FIGS. 6A and 6B. According to embodiments of the present invention as shown in FIGS. 1C and 2C, the longer the tapered sides become, the more this effect increases. This effect increases as the tapered angle is about 45 degrees. The length of the tapered sides S1 and S2 (FIG. 2C) is preferably longer than about 50% of the total length of the short sides S3 and S4.

A liquid crystal display according to the third embodiment of the present invention will be described.

Figure 3A:
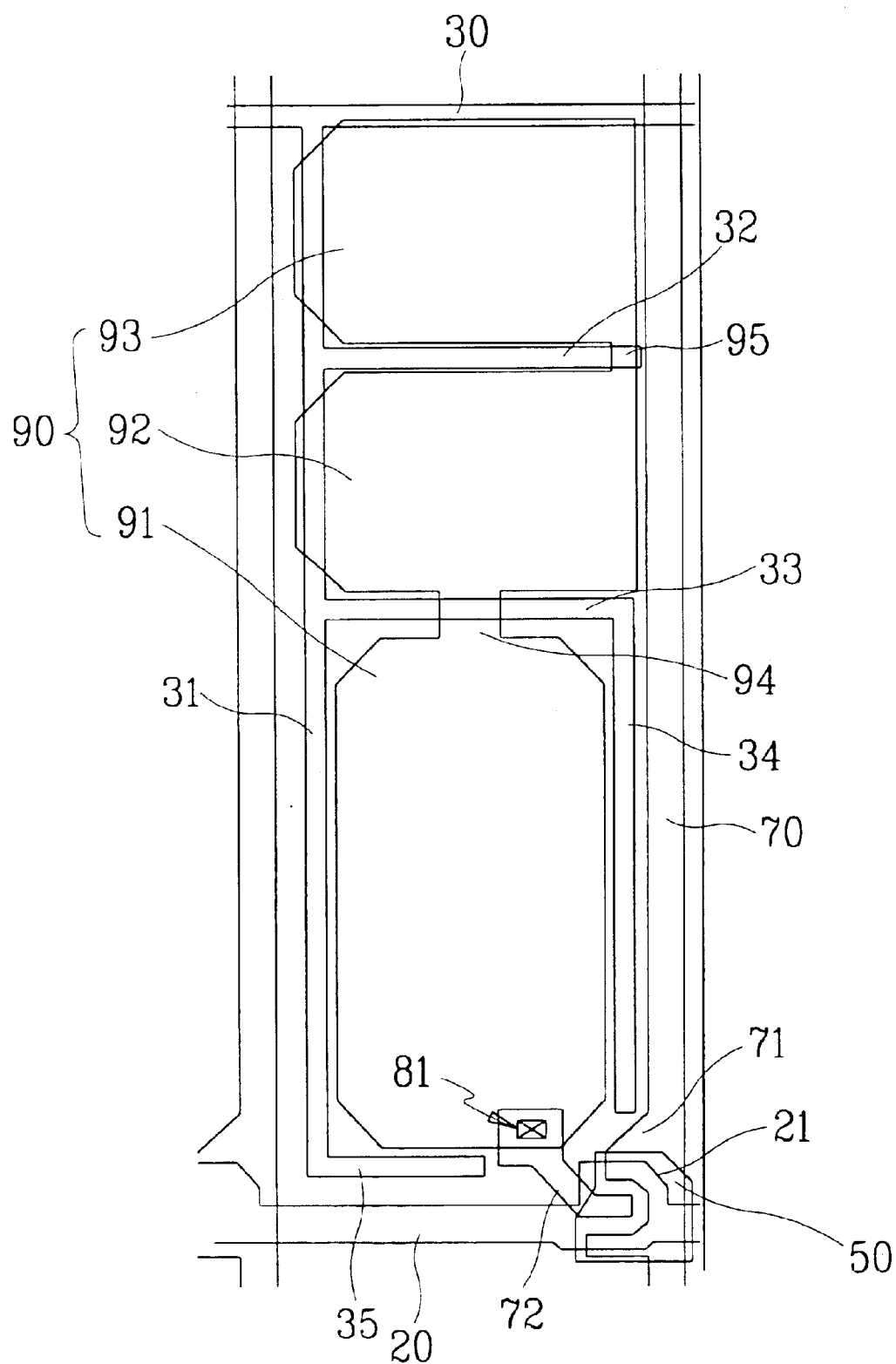
Figure 3B:
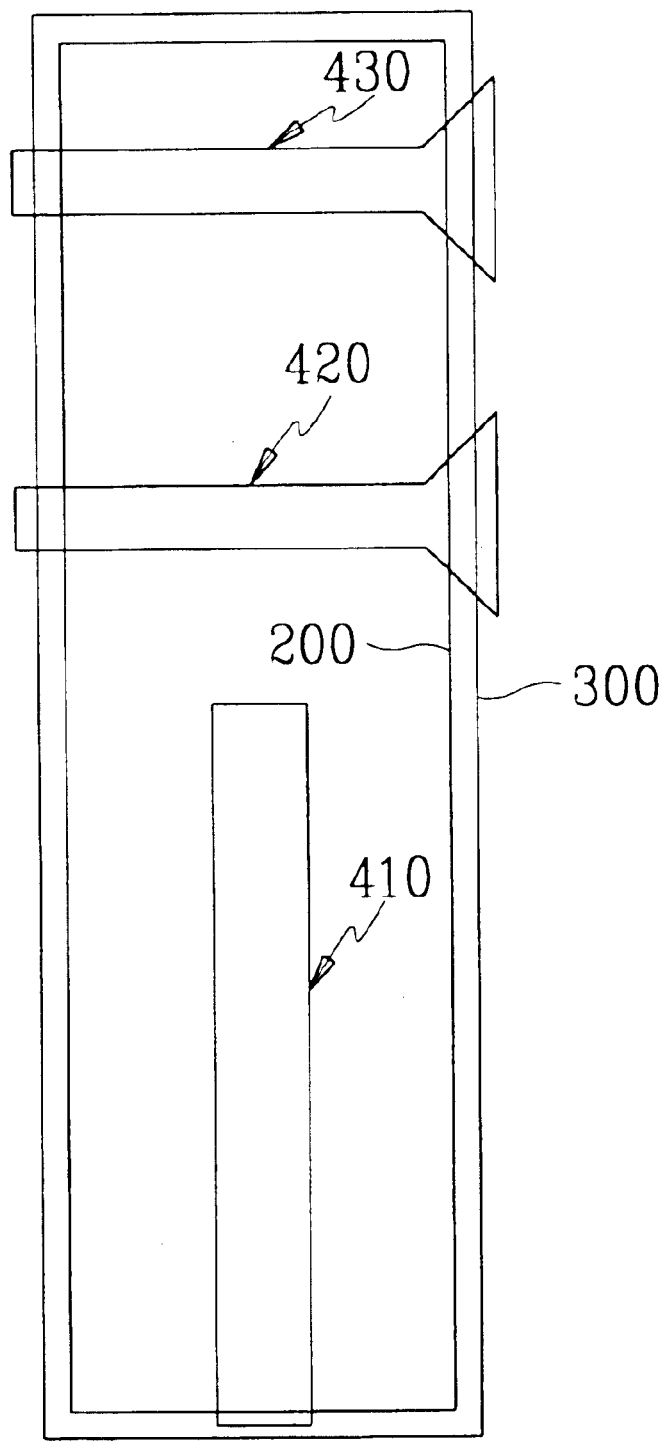
Figure 3C:
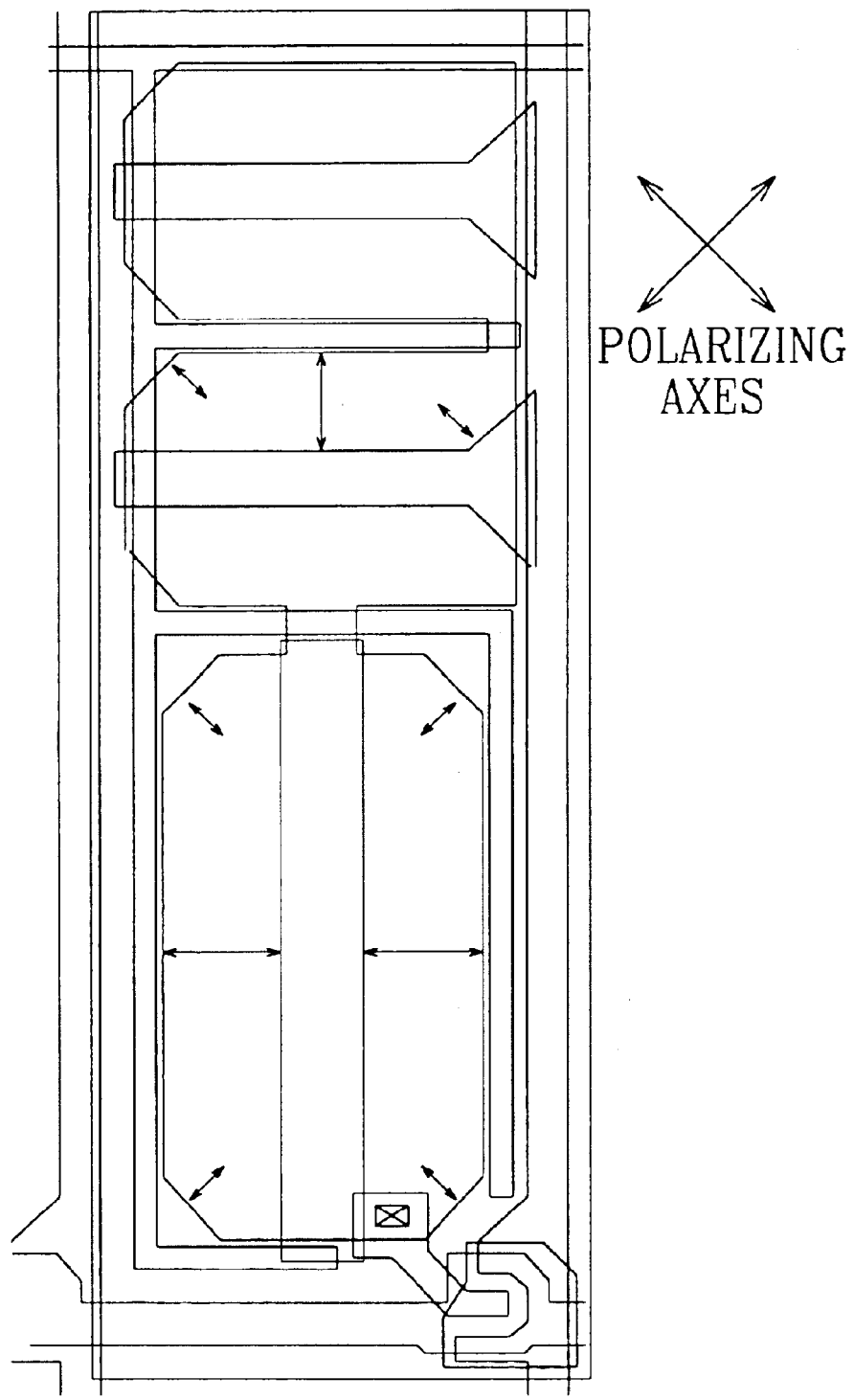

FIGS. 3A, 3B, and 3C are layout views of a thin film transistor array panel, a color filter panel, and a liquid crystal display according to the third embodiment of the present invention, respectively.

As shown in FIGS. 3A, 3B and 3C, except for the planar shapes of a pixel electrode 90 and apertures 410, 420, and 430 in a common electrode 400 (in FIGS. 1E and 1F), a liquid crystal display according to the third embodiment has the same structure as that according to the first embodiment.

In detail, a middle and an upper partitions 92 and 93 of the pixel electrode 90 have only two chamfered corners, which are located opposite a connecting member 95 connecting the middle and the upper partitions 92 and 93, as shown in FIG. 3A. In addition, a first aperture 410 in the common electrode 400 (in FIGS. 1E and 1F) have rectangular ends rather than triangular ends, and each of a second and a third apertures 420 and 430 has one triangular end and one rectangular end, as shown in FIG. 3B. The triangular ends are preferably disposed opposite the chamfers of the partitions 92 and 93, as shown in FIG. 3C.

Therefore, in the liquid crystal display according to the third embodiment of the present invention, each domain, enclosed by apertures 410, 420, and 430 in the common electrode 400 (in FIGS. 1E and 1F) and the partitions 91, 92, and 93 of the pixel electrode 90, have two long sides and four short sides. Two short sides opposite in diagonal curves at an angle of about 120° to about 150° with the long sides and the other two short sides are perpendicular to the long sides.

A liquid crystal display according to the fourth embodiment of the present invention will be described.

Figure 4A:
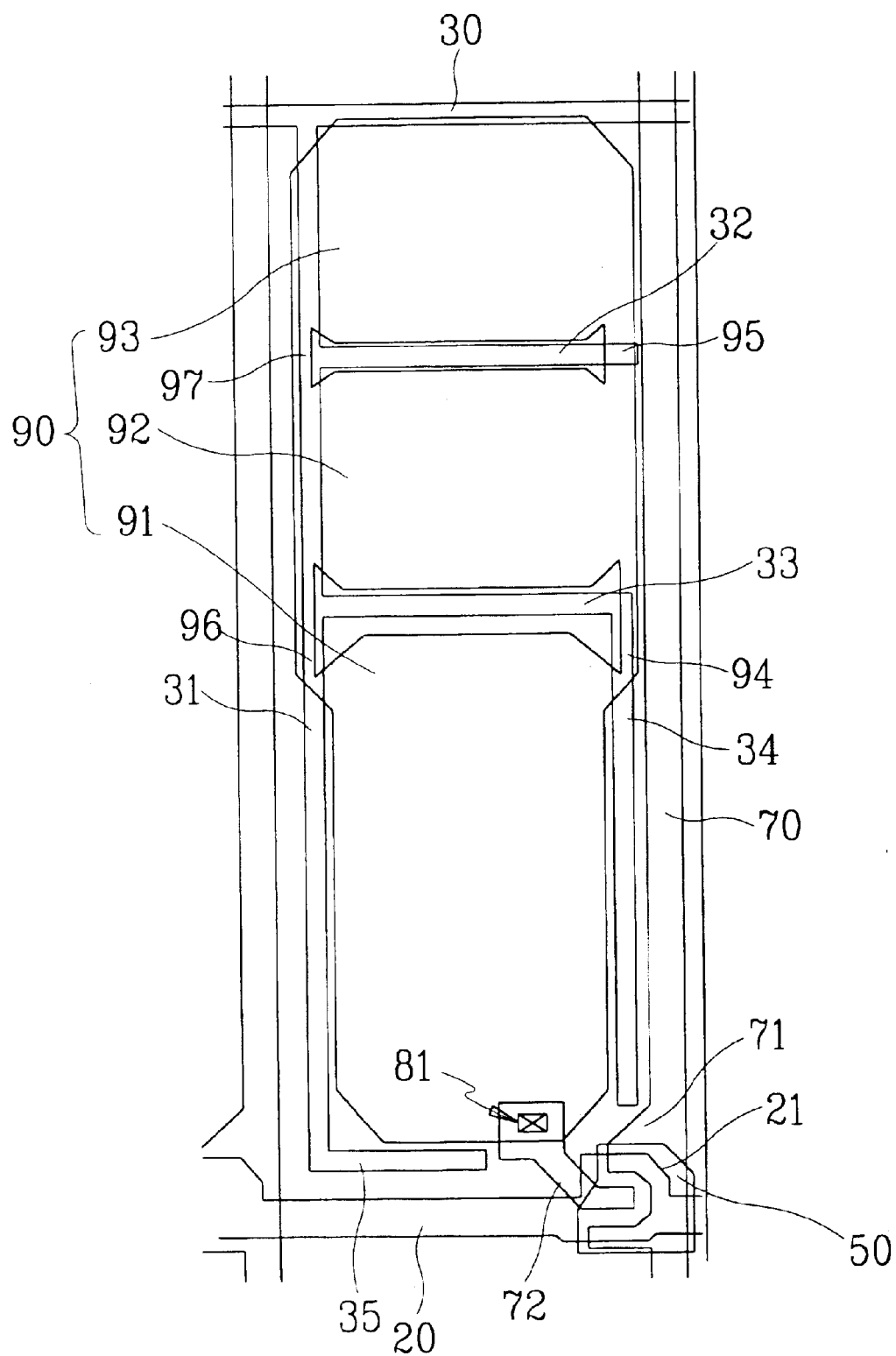
Figure 4B:
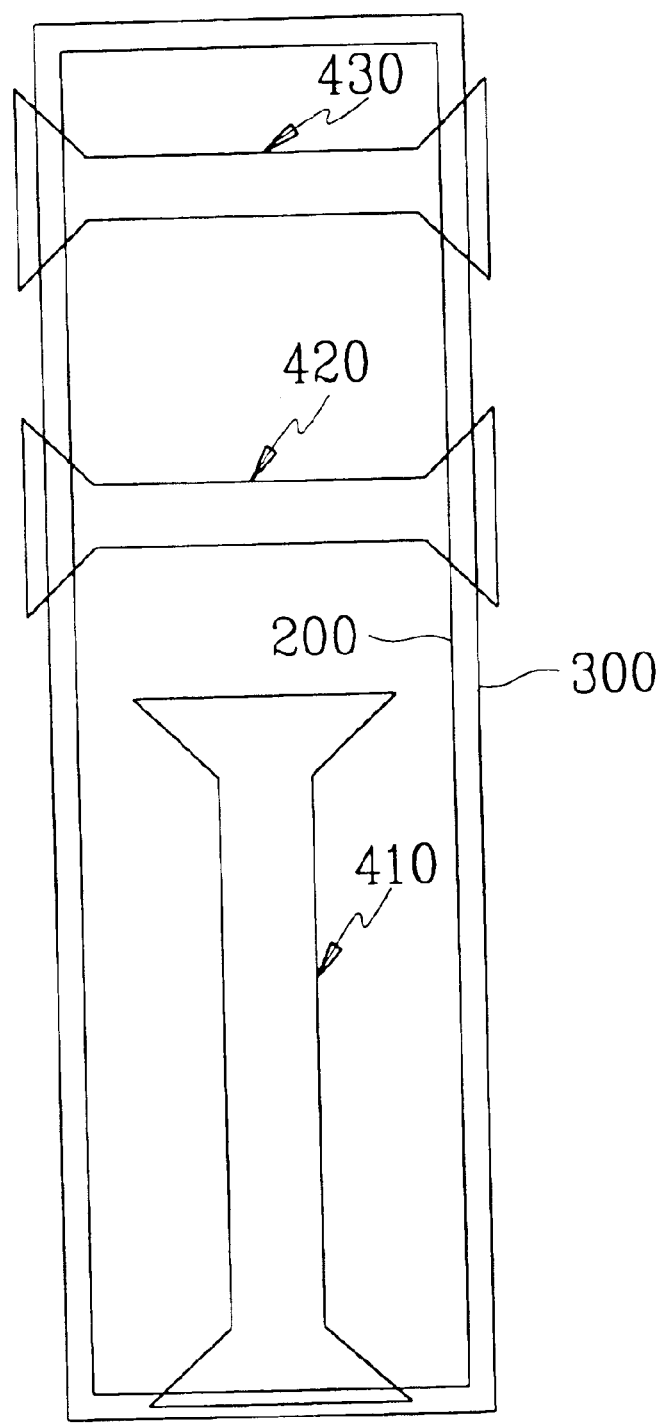
Figure 4C:
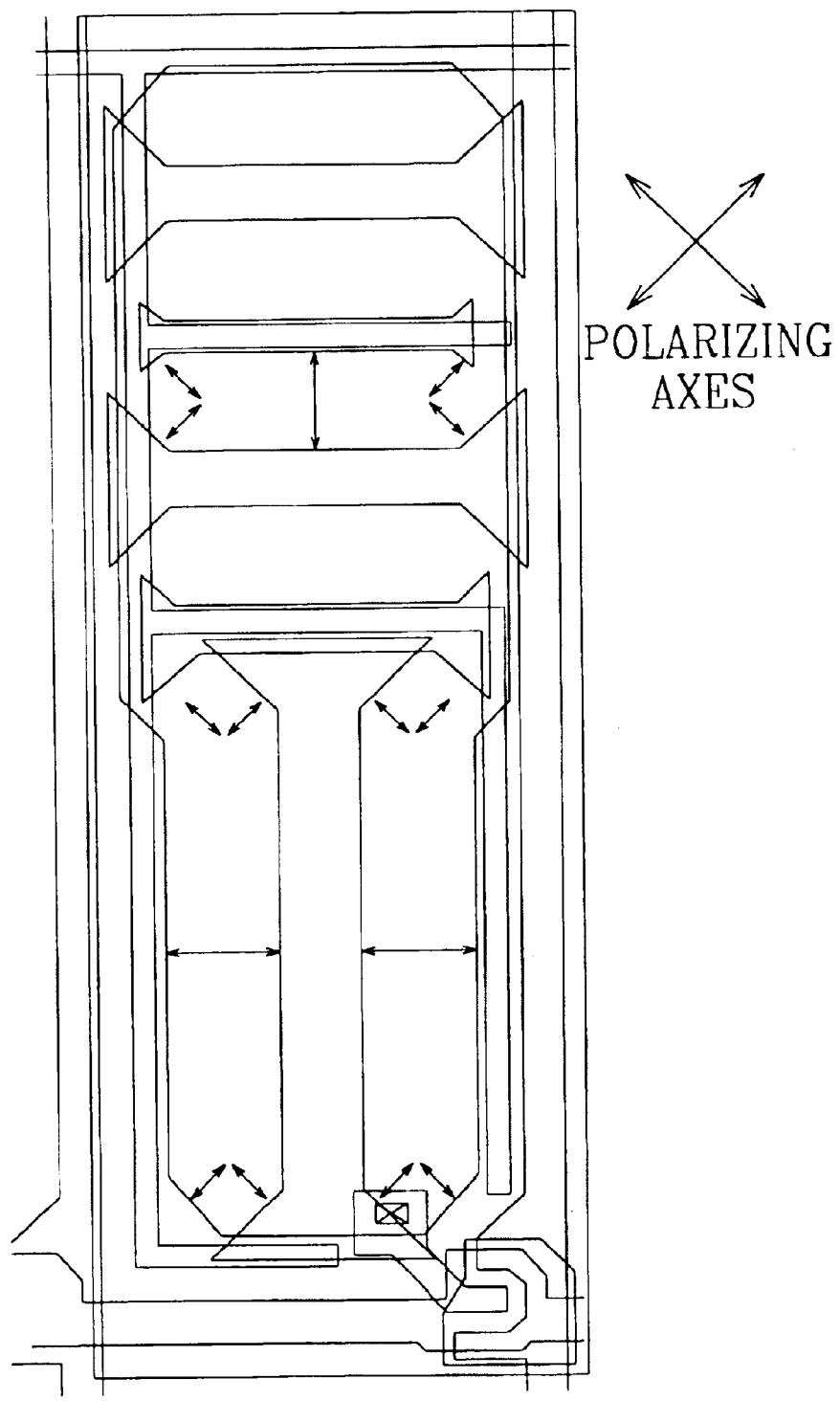

FIGS. 4A, 4B, and 4C are layout views of a thin film transistor array panel, a color filter panel, and a liquid crystal display according to the fourth embodiment of the present invention, respectively.

As shown in the FIGS. 4A, 4B and 4C, except for the shape of a pixel electrode 90 of a thin film transistor array panel, a liquid crystal display according to the fourth embodiment has the same structure as that according to the first embodiment. The differences between the fourth and the first embodiments are that three partitions 91, 92, and 93 of the pixel electrode 90 in this embodiment are connected at both corners adjacent to data lines 70 and thus the chamfers become smaller than those according to the first embodiment.

In detail, the lower and the middle partitions 91 and 92 are connected through two connecting members 94 and 96, and the middle and upper partitions 92 and 93 are connected through two connecting members 95 and 97. The connecting members 94 and 95 are located at right corners of the partitions, and the connecting members 96 and 97 are located at left corners of the partitions as shown FIG. 4A. In addition, the triangular ends of apertures 410, 420, and 430 according to this embodiment are substantially smaller than those according to the first embodiment, as shown in FIG. 4B.

A liquid crystal display according to the fifth embodiment of the present invention will be described.

Figure 5A:
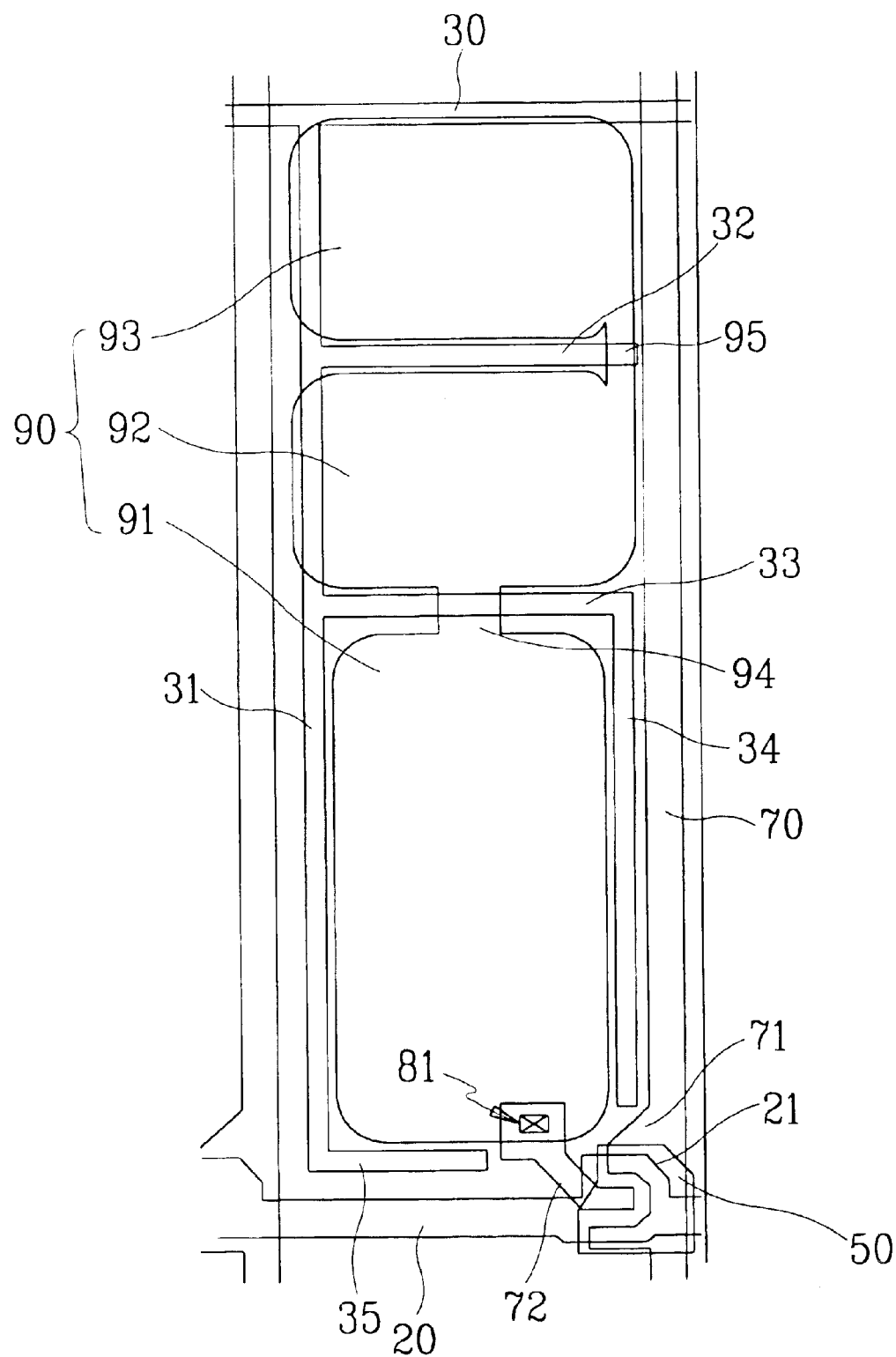
Figure 5B:
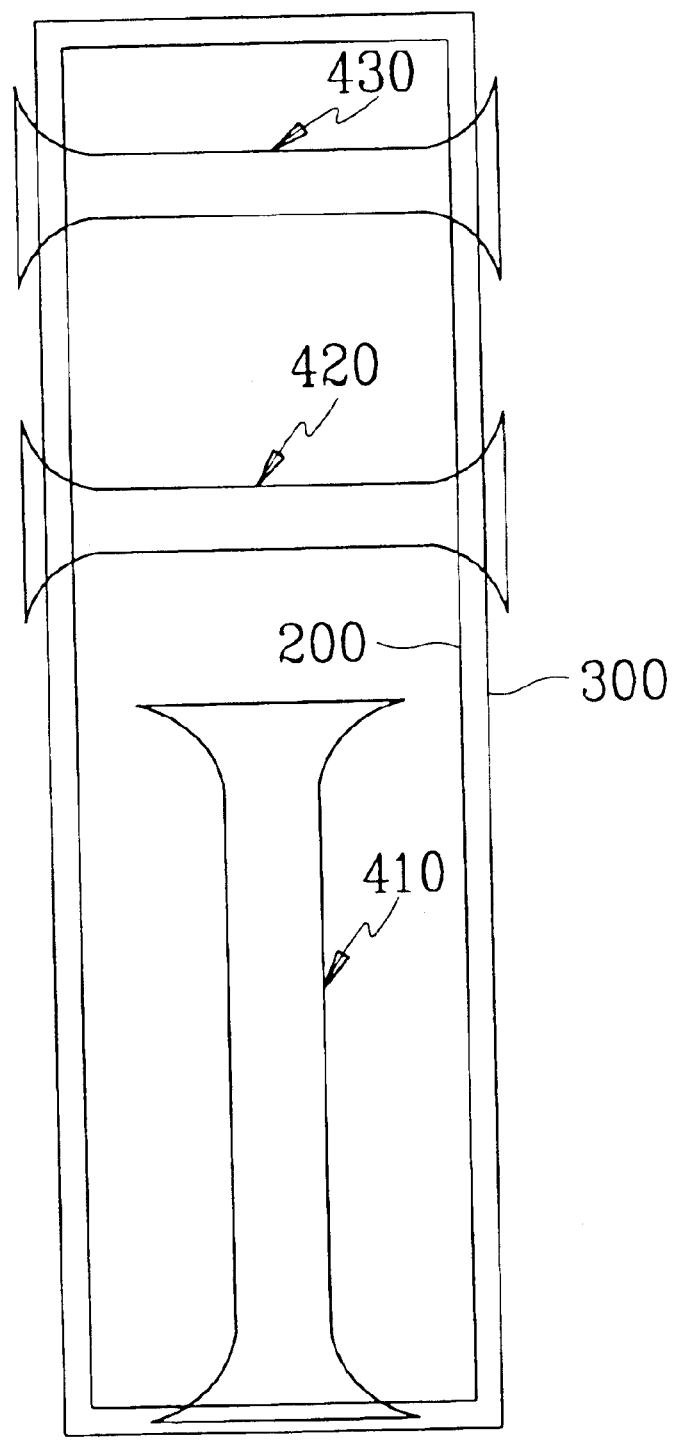
Figure 5C:
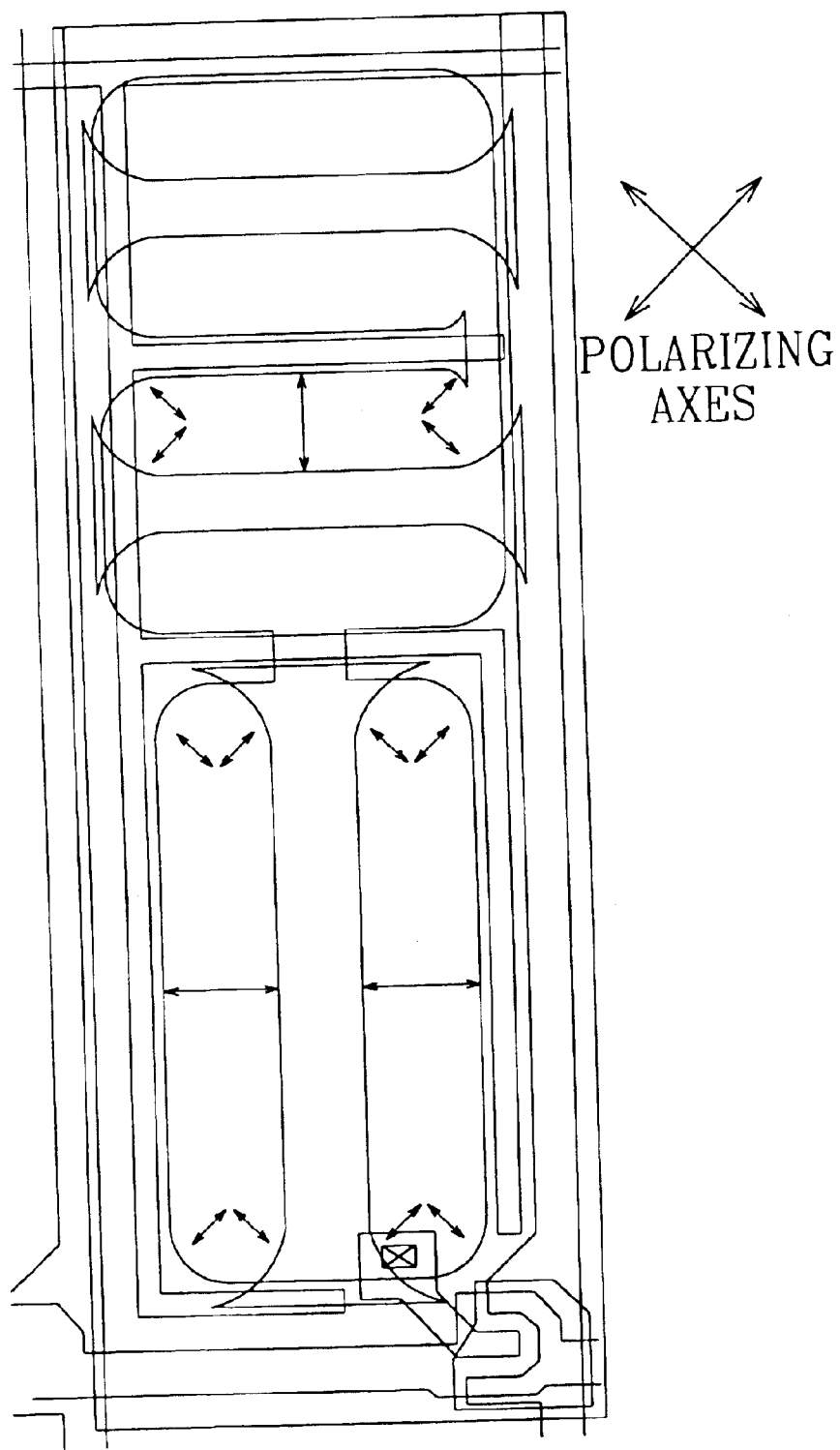

FIGS. 5A, 5B, and 5C are layout views of a thin film transistor array panel, a color filter panel, and a liquid crystal display according to the fifth embodiment of the present invention, respectively.

As shown in FIGS. 5A, 5B and 5C, except for the planar shape of a pixel electrode 90 and apertures 410, 420 and 430 of a common electrode 400 (in FIGS. 1E and 1F), a liquid crystal display according to the fifth embodiment has the same structure as that according to the first embodiment.

In detail, chamfers of three partitions 91, 92, and 93 of the pixel electrode 90 according to this embodiment are convexly curved, as shown in FIG. 5A. In addition, lateral sides of triangular ends of the apertures 410, 420, and 430 are concavely curved, as shown in FIG. 5B. Therefore, in the liquid crystal display according to the fifth embodiment of the present invention, each domain, enclosed by the apertures 410, 420, and 430 in the common electrode 400 and the partitions 91, 92, and 93 of the pixel electrode 90, has a shape of rectangle with round corners.

The curved short sides also prevent the overshoot of the screen brightness and reduce the texture as the tapered sides of the above embodiments.

In the drawings and specification, there have been disclosed typical preferred embodiments of the present invention and, although specific terms are employed, they are used in a generic and descriptive sense only and not for purposes of limitation, the scope of the invention being set forth in the following claims.

What is claimed is:

1. A liquid crystal display comprising:
    a first substrate;
    a first signal line formed on the first substrate and extending in a direction;
    a second signal line intersecting but insulated from the first signal line;
    a pixel electrode formed in a pixel area defined by intersections of the first signal line and the second signal line, the pixel electrode having a plurality of partitions;
    a switching element connected to the first signal line, the second signal line, and the pixel electrode;
    a second substrate opposite the first substrate;
    a black matrix formed on the second substrate; and
    a common electrode formed over the second substrate having a plurality of domain defining members, wherein each domain is enclosed by the partitions of the pixel electrode and the domain defining members and has at least one long side parallel or perpendicular to the first signal line and at least one tapered side curved at an angle of about 30 to about 60 degrees with the first signal line.

2. The liquid crystal display of claim 1, wherein each of the plurality of the partitions has a rectangular shape and includes at least one chamfered corner.

3. The liquid crystal display of claim 2, wherein each of the plurality of the partitions includes four chamfered corners.

4. The liquid crystal display of claim 1, wherein each of the plurality of the partitions has a rectangular shape including at least one convex corner.

5. The liquid crystal display of claim 4, wherein each of the plurality of the partitions includes four convex corner.

6. The liquid crystal display of claim 1, wherein each of the plurality of the partitions is arranged in the same direction as the second signal line.

7. The liquid crystal display of claim 1, wherein the plurality of partitions are connected by connecting members therebetween.

8. The liquid crystal display of claim 1, further comprising a plurality of storage electrodes disposed between each of the plurality of partitions of the pixel electrode.

9. The liquid crystal display of claim 1, wherein the black matrix is made of a double-layered structure of $Cr/CrO_2$.

10. The liquid crystal display of claim 1, wherein the plurality of domain defining members include a plurality of apertures in the common electrode.

11. The liquid crystal display of claim 10, wherein each of the plurality of apertures has at least one end part shaped as a triangle.

12. The liquid crystal display of claim 11, wherein the triangle has an angle made by the bottom side and both lateral sides of the triangle in the range of about 30° to about 60°.

13. The liquid crystal display of claim 1, wherein the plurality of domain defining members include a plurality of protrusions.

14. The liquid crystal display of claim 1, wherein each said domain is defined by at least two tapered sides 1, each adjacent to a short side, wherein the length of each of the two tapered sides is longer than the length of the adjacent short sides.

15. The liquid crystal display of claim 1, further comprising a liquid crystal layer interposed between the first substrate and the second substrate.

16. The liquid crystal display of claim 1 wherein each domain is shaped substantially as two trapezoids sharing a common long side.

17. The liquid crystal display of claim 1 wherein each domain is shaped substantially as a trapezoid joined with a rectangle.

18. A liquid crystal display comprising:

a first panel including a first signal line, a second signal line intersecting the first signal line, a pixel electrode having a plurality of partitions, and a thin film transistor, wherein the thin film transistor includes a gate electrode extended from the first signal line, a source electrode extended from the second signal line, and a drain electrode connected to the pixel electrode, wherein the pixel electrode is formed in a pixel area defined by intersections of the first signal line and the second signal line; and a second panel disposed opposite the first panel, the second panel including a common electrode having a plurality of domain defining members, each of the plurality of domain defining members having at least one end portion shaped as a triangle.

19. The liquid crystal display of claim 18, wherein each of the plurality of the partitions has a rectangular shape and includes at least one chamfered corner.

20. The liquid crystal display of claim 18, wherein each of the plurality of the partitions is rectangular shape and includes at least one convex corner.

21. The liquid crystal display of claim 18, further comprising a liquid crystal layer between the first panel and the second panel.

22. The liquid crystal display of claim 18, further comprising a black matrix on the second panel to define the pixel area.

23. The liquid crystal display of claim 18 wherein each domain is shaped substantially as two trapezoids sharing a common long side.

24. The liquid crystal display of claim 18 wherein each domain is shaped substantially as a trapezoid joined with a rectangle.

* * * * *